United States Patent
Jacobs

[15] 3,696,179
[45] Oct. 3, 1972

[54] EXTRUDING AND FILLING CONTAINERS MADE OF FOAMED THERMOPLASTIC POLYMER

[72] Inventor: William A. Jacobs, 514 Grassy Hill Road, Orange, Conn. 06477

[22] Filed: Oct. 15, 1970

[21] Appl. No.: 81,099

Related U.S. Application Data

[63] Continuation-in-part of Ser. No. 726,465, May 3, 1968, abandoned.

[52] U.S. Cl. ..........................264/45, 53/29, 53/122, 53/140, 53/182, 156/146, 264/47, 264/151, 264/210, 425/97, 425/111, 425/312, 425/817
[51] Int. Cl. ..............................................B29d 27/00
[58] Field of Search..............264/173, 95, 47, 51, 45; 156/145, 146; 53/29, 122, 140, 182; 18/13 F

[56] References Cited

UNITED STATES PATENTS

| | | | |
|---|---|---|---|
| 2,962,843 | 12/1960 | Haelzer | 264/95 X |
| 3,290,198 | 12/1966 | Lux | 264/51 X |
| 1,242,562 | 10/1917 | Laskey | 53/122 X |
| 2,576,444 | 11/1951 | Clinefelter | 18/13 F X |
| 3,256,673 | 6/1966 | Tew | 53/182 |
| 3,331,902 | 7/1967 | Stark | 264/99 |
| 3,399,508 | 9/1968 | Frielingsdorf | 53/140 |
| 2,575,138 | 11/1951 | Slaughter | 18/13 F X |
| 2,958,171 | 11/1960 | Deckers | 264/99 UX |
| 2,618,814 | 11/1952 | Paton | 156/145 |
| 3,425,185 | 2/1969 | Samways | 53/182 |

Primary Examiner—Julius Frome
Assistant Examiner—Paul A. Leipold
Attorney—Christen & Sabol

[57] ABSTRACT

Method for the simultaneous extrusion and filling of expandable thermoplastic containers wherein the expandable thermoplastic material is extruded, clamping means gather and seal the foamed thermoplastic after it is extruded and while it is still in a state of plasticity so that the sealed area is formed by fusion of a foamed thermoplastic material, intermittently operated feed means fills the container after the seal is made and the substance being packaged causes inflation and shaping of the container, and clamp means is operative upon the deenergization of the feed means to effect a similar type seal for the other end of the container.

9 Claims, 10 Drawing Figures

INVENTOR
WILLIAM A. JACOBS

Christen, Sabol & O'Brien
ATTORNEYS

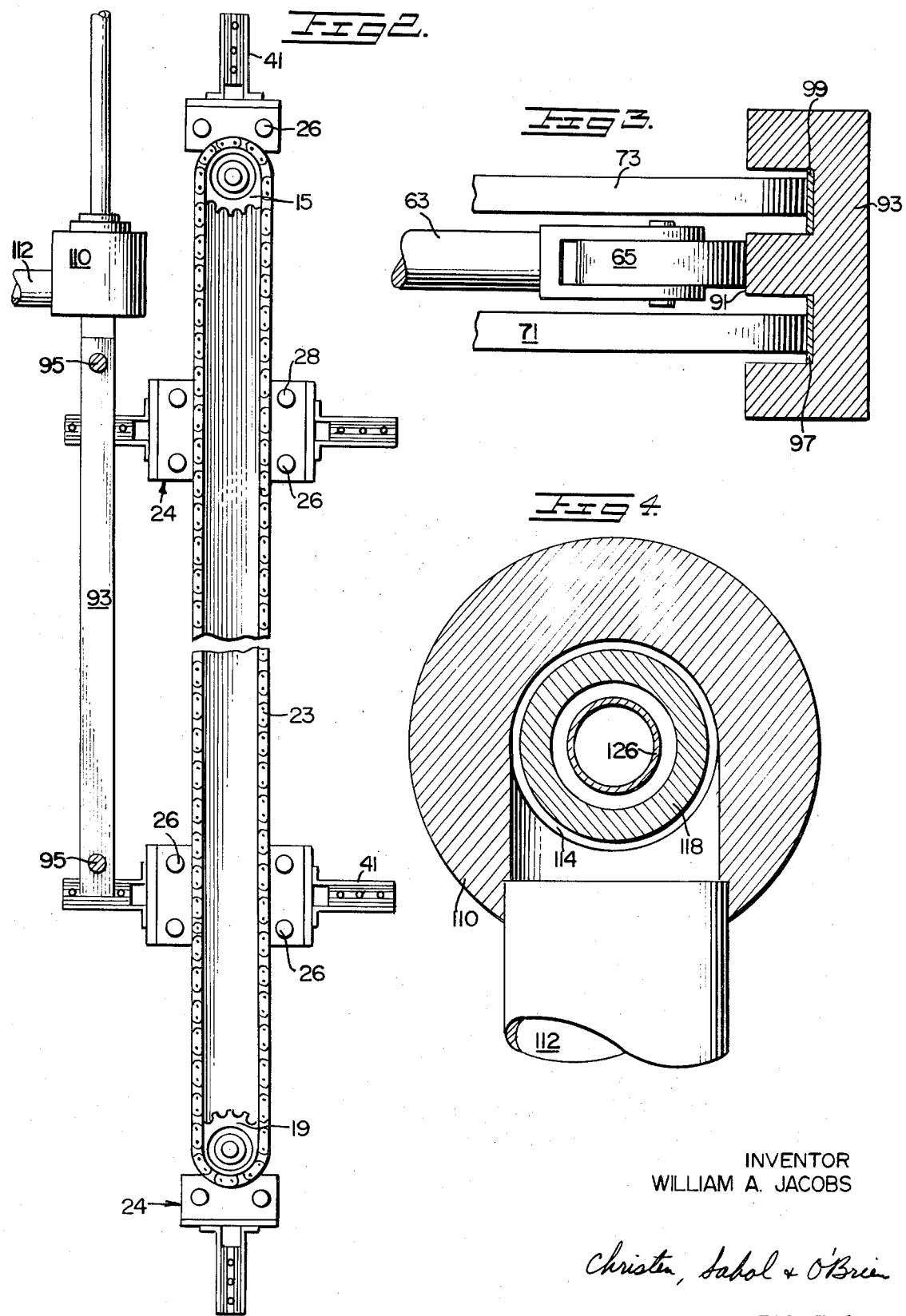

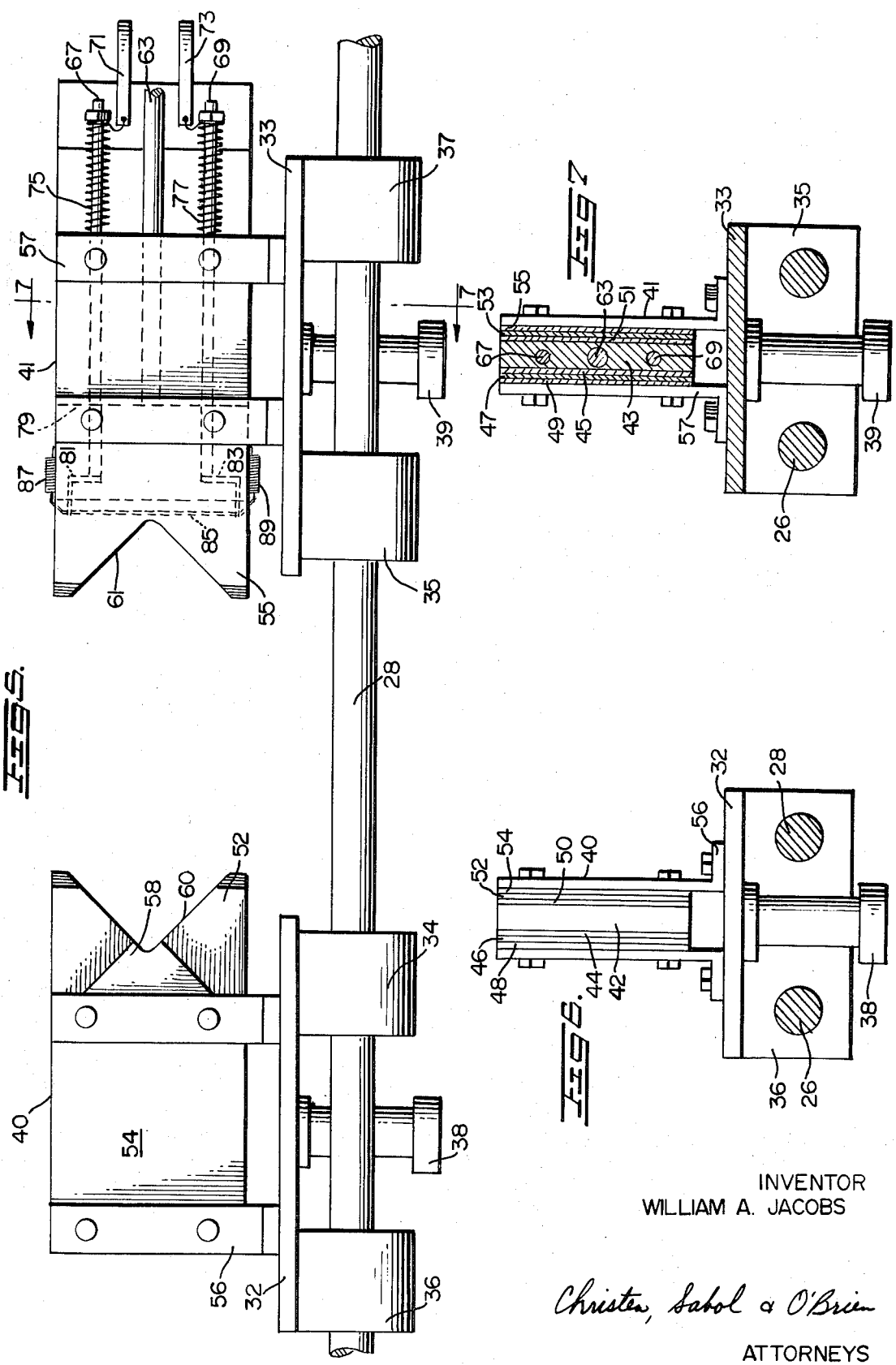

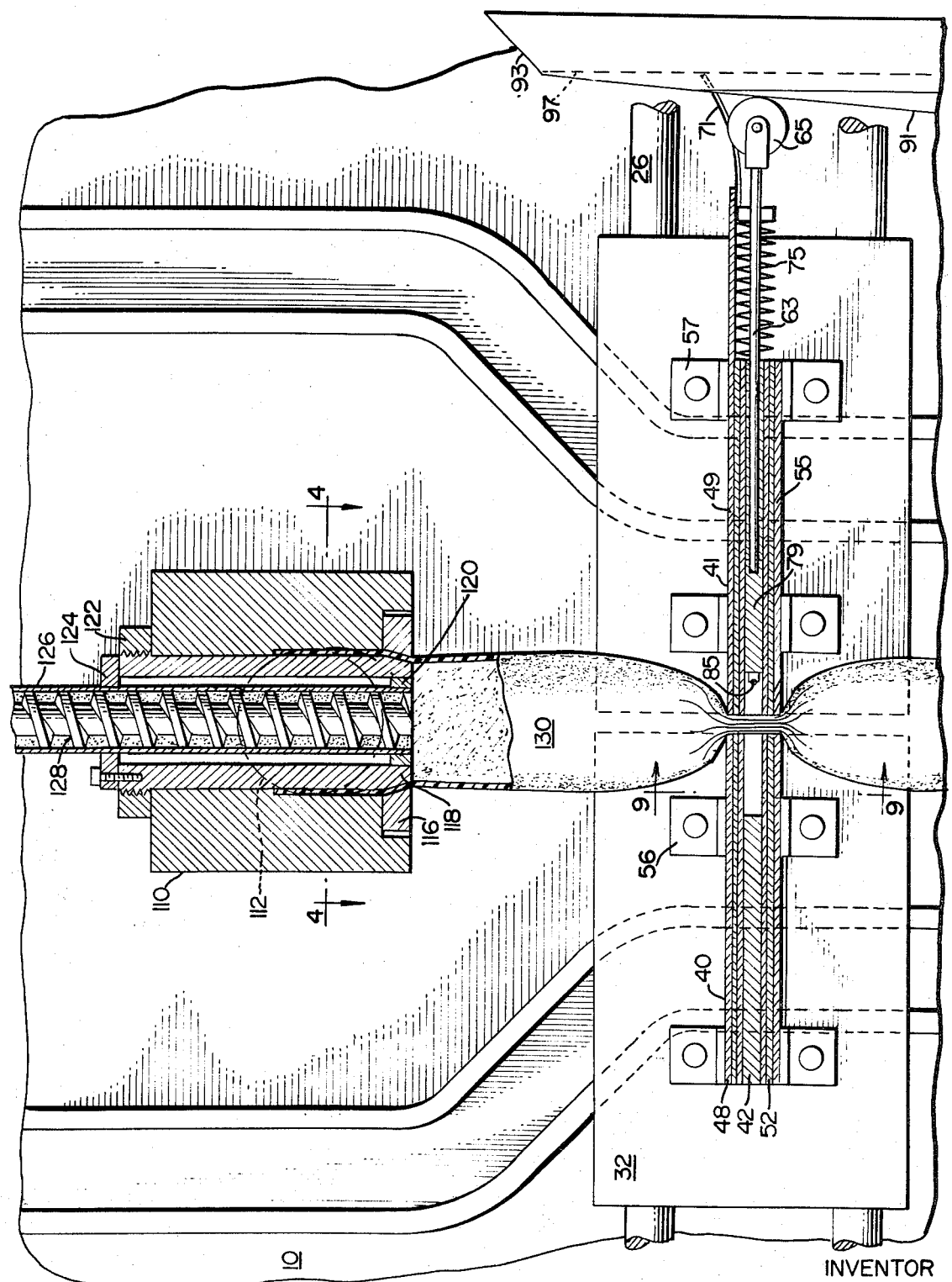

INVENTOR
WILLIAM A. JACOBS

Christen, Sabol & O'Brien
ATTORNEYS

EXTRUDING AND FILLING CONTAINERS MADE OF FOAMED THERMOPLASTIC POLYMER

This application is a continuation-in-part of Ser. No. 726,465 filed May 3, 1968 and now abandoned.

BACKGROUND OF THE INVENTION

1. Field of the Invention

This invention relates to the method and apparatus for making, filling and sealing thermoplastic containers, and in particular, to such an arrangement utilizing expandable thermo-plastic material for the container.

2. Description of the Prior Art

The prior art, as exemplified by U.S. Pat. Nos. 2,618,184, 2,958,171 and 2,962,843, is cognizant of the general arrangement of extruding thermoplastic material in the form of a tube and expanding it with air, cooling it, then heat-sealing one end thereof to form a container, and then filling the container with the substance to be packaged. However, such known methods and/or apparatus have utilized a thermoplastic material of the non-expandable type, have required some means for inflating, shaping and supporting the container, have required separate heating and/or cooling means for the extruded thermoplastic, and have utilized various methods for evacuating the container before or during the filling thereof. Because of the complex apparatus and the controls therefor, the known methods that have been used on a commercial basis have not permitted a high production rate and have been uneconomical with respect to the unit cost of the finished product.

In the prior art mentioned above, a tube of unfoamed plastic must be inflated in order to form the container walls which then must be cooled prior to filling to strengthen the walls and to prevent the walls from sticking to each other and/or the filling material. When the substance being packaged is a powder or liquid, the weight of the powder or liquid coming into contact with the walls of an unfoamed plastic tube before the walls are adequately cooled could cause rupture of the tube. In order to cool the tube adequately so that this would not occur, the tube is moved a very considerable distance from the extrusion die and cooling air is applied internally and externally. The use of cooling air on unfoamed thermoplastic containers also is necessary in the prior art because when such unfoamed thermoplastic material leaves the die head, it has little tensile strength and, until cooled, it would be useless for bagging purposes. Further complications ensue because the air used for cooling and inflating must be evacuated in order to fill the tube. If comminuted powder is the filling material, much of it goes out with the air creating conditions of possible valve clogging, etc., in addition to making the area generally dirty as well as wasting filling material, also, the resultant package is not a well-compacted one.

The prior art as exemplified by U.S. Pat. No. 3,343,216 discloses methods and apparatus for extruding a tube of foamable, expandable thermoplastic materials to provide foamed sheet material. But even in this instance it is conventional to utilize air or some other gaseous element as an inflating means. U.S. Pat. No. 3,290,198 discloses a method and apparatus which comprises (1) extruding from an extruder an extrudable, foamable composition comprising a normally non-explosive, synthetic organic polymer and a non-explosive concentration of a blowing agent, which is normally liquid under the pressure and temperature existing in the extruder and is normally gaseous under ambient (substantially atmospheric) pressure at the temperature of the composition as it leaves the extruder, to form a foamed tube; (2) cooling the interior surface of the tube, immediately after it leaves the extruder, and expanding the tube, by means of a plug which is chilled by cooling water circulated through it and which has external dimensions larger than the internal dimensions of the tube; (3) cooling the exterior surface of the tube, immediately after it leaves the extruder, by means of air jets positioned completely around the external periphery of the tube; (4) at a distance from the extruder, pinching spaced apart portions of the tube to form closed tetrahedron containers filled with air. Heated pinching blades are necessary to close the portions of the tube because of the previous cooling steps and the distance of the pinching blades from the extruder. The resulting containers then are separated by cutting with a knife and can be filled by piercing the wall with a needle and introducing filling fluid through the needle. No explanation is provided for removing air in the containers prior or during filling, although this is possible by piercing the wall with another hollow needle. After filling, the container is resealed by heating the nub, formed when inserting the needle, to melt it and fill the hole formed by the needle.

SUMMARY OF THE INVENTION

In practicing the present invention, a foamed thermoplastic tube is simultaneously made and filled with a substance to be packaged by extruding a foamable thermoplastic material through an extrusion die to form a foamed hollow container, closing a portion of the hollow container immediately as it issues from the extrusion die, and feeding the substance to be packaged into the formed hollow container as it is being extruded whereby the foamed hollow container receives the substance before permanent setting of the foamed hollow container.

An object of this invention is to provide a method and apparatus for making, filling and sealing tubular containers in the form of an extruded tube of foamed resinous material free of a longitudinal seam.

Another object of this invention is to construct a filled package of foamed thermoplastic that has little or no air space and has superior qualities with respect to rigidity and cushioning than a similarly made package constructed of the same quantity of unfoamed or conventional thermoplastic material.

The present invention has another object in that packaged material deposited within a tube is precluded from escaping during the packaging operation.

It is another object of the present invention to construct a foamed thermoplastic tube without the need for cooling or inflating means and thus permit aseptic filling of a container.

The present invention has a further object in that progressive gathering of the walls of a foamed thermoplastic tube into a decreasing cross section permits the formation of an effective seal without heating elements by merely utilizing the latent heat of the foamed thermoplastic material, which seal substantially eliminates the possibility of wicking.

An additional advantage of the present invention is the fact that the continuous flow of foamed plastic material is inflated, not by the use of air or other pressurized gas, but by the material itself which is being packaged. This is possible because of the unique qualities of the foamed plastic and could not possibly apply to unfoamed thermoplastic material because of its lack of tensile strength. For example, as the foamable resinous material exists from the extrusion die, the immediate rapid internal expansion that takes place when the blowing agent transforms from a liquid to a gas permits both inner and outer surfaces of the extruded tube to cool so rapidly that they are able to come immediately into contact with other surfaces and materials without sticking. Moreover, this cooling effect serves to rapidly congeal the thermoplastic which thus rapidly gains strength. This particular characteristic permits a very important technique to be followed in the case of filling finely comminuted powder items, such as activated carbon, talcum powder, dye pigments, cement, etc. into any container. This technique, which is common knowledge in the powder filling industry, is known as a "bottom-up" fill and is accomplished when the end of a powder filling auger or similar filling device comes into immediate contact with the bottom of the container to be filled. As the auger starts to feed powder, the container is pushed away from the end of the auger by the force of the fill of the powder. This results in a generally firm package having a minimum amount of dust and fluffed material and little or no air spaces. The same effect occurs in the case of filling the foamed thermoplastic tube, and in fact, in an even more efficient manner since the back pressure on the powder is not only in one direction but actually in all directions resulting in well-compacted contents.

Other objects and advantages of the present invention will become apparent from the following description taken in conjunction with the accompanying drawings.

BRIEF DESCRIPTION OF THE DRAWINGS

FIG. 2 is a side elevation view of FIG. 1;

FIG. 3 is an enlarged cross section taken along the line 3—3 of FIG. 1;

FIG. 4 is an enlarged cross section taken along line 4—4 of FIG. 8;

FIG. 5 is an enlarged elevation of a detail of FIG. 1;

FIG. 6 is an end view looking from the left side of FIG. 5;

FIG. 7 is a cross section taken along line 7—7 of FIG. 5;

FIG. 8 is an enlarged elevation with parts in section of a detail in FIG. 1;

DESCRIPTION OF THE PREFERRED EMBODIMENT OF APPARATUS

Figure 1:
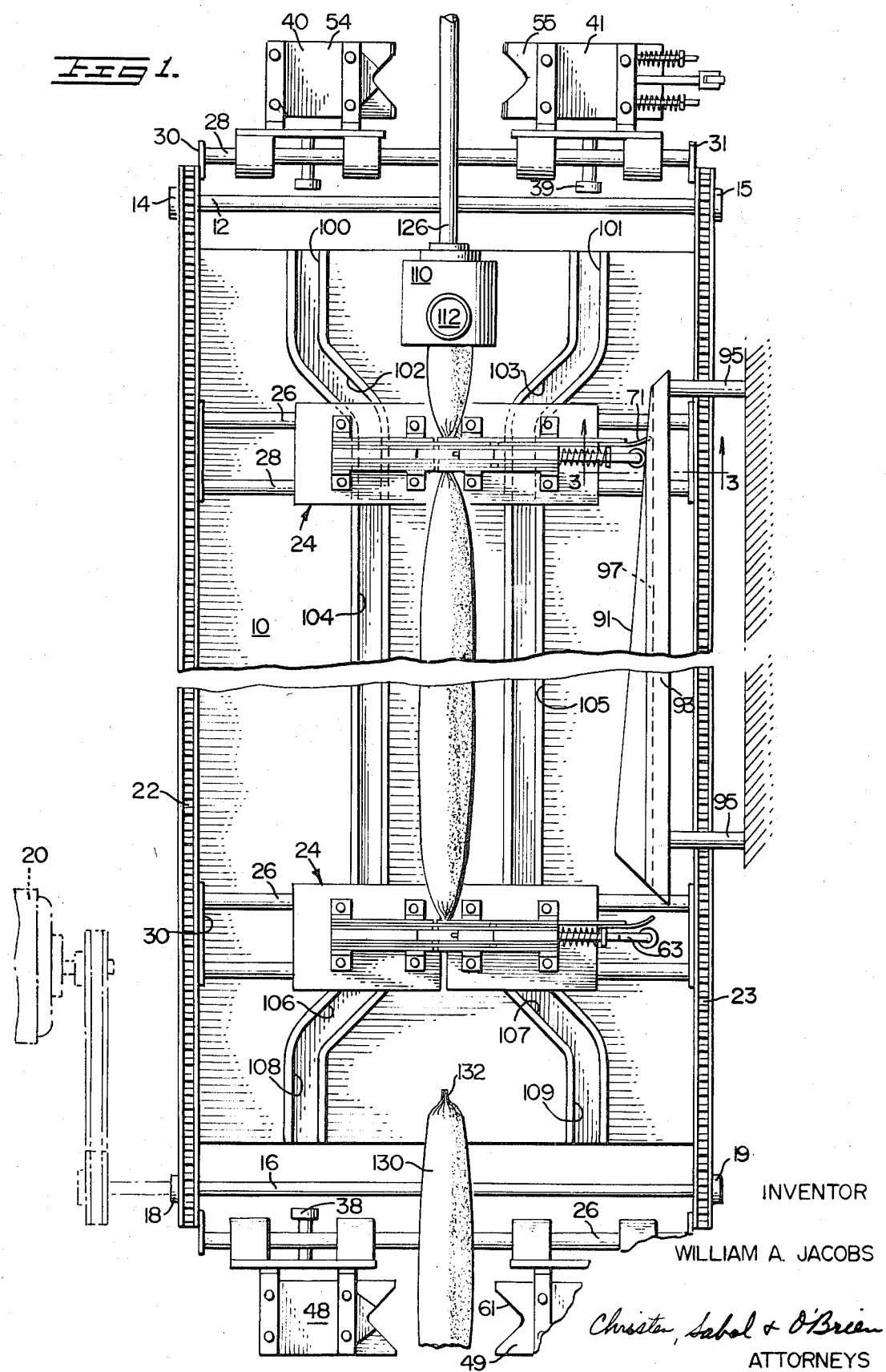
FIG. 1 is a partial front elevation view of apparatus employed in the method of manufacture according to the present invention.

As is illustrated in FIG. 1, the apparatus for performing the continuous filling and extruding method of the present invention, is embodied on a supporting rack 10 which is illustrated in a vertical position secured to a wall but which may be self supporting and may even be in horizontal or other planer positions. A shaft 12 extending between a pair of sprockets 14 and 15 is disposed on the top of the rack 10 while a similar shaft 16 between sprockets 18 and 19 is disposed on the bottom of rack 10. The shaft 16 has an extension which is connected to a suitable belt and pulley arrangement to a variable speed motor 20. An endless drive chain 22 extends between the sprockets 14 and 18 on the left side and a similar chain 23 extends between the sprockets 15 and 19 on the right side.

A plurality of clamp carriers, indicated generally at 24, are secured to the drive chains 22–23 for unitary movement therewith. As is shown in FIG. 2, six clamp carriers 24 are equally spaced around the periphery of the drive chain 23. The number of carriers may be varied in accordance with particular operations. Inasmuch as the carriers 24 are identical in structure and function, the structural details of only one such carrier will be described in detail.

Each carrier 24 includes a pair of spaced rods 26 and 28 secured on their left side by means of a plate 30 to the chain 22 and on their right side by a similar plate 31 to the chain 23. A platform 32 (FIG. 5) is slidably mounted on the left side of rods 26 and 28 by means of front and rear journal plates 34 and 36; centrally disposed between the journal plates 34 and 36 and centrally located between rods 26 and 28 is a cam follower 38 perpendicularly extending from the undersurface of platform 32. A clamping or gathering element 40 has a laminated construction with a central spacer 42 sandwiched between two sets of plates; the first set of plates includes an inner plate 44, an intermediate plate 46 and an outer plate 48, while the second set of plates similarly includes inner, intermediate and outer plates 50, 52 and 54, respectively. The two sets of plates and the spacer 42 are fastened together as a unit by any suitable means, such as bolts and L-shaped brackets 56, to the top surface of platform 32 in edgewise relation thereto. The inner plates 44 and 50 and the outer plates 48 and 54 each have a triangular end 58 (FIG. 5) while the intermediate plates 46 and 52 extend beyond the triangular ends 58 and are each provided with a triangular notch 60; the ends 58 and notches 60 have identical apex angles that intersect each other adjacent their apexes in a transverse plane defined by a bisector of the apex angle.

To facilitate an understanding of the structure forming mating parts of the clamp carrier 24, such mating parts are identified with odd numbered reference numerals which are next in sequence to the numerals for their counterparts described above. For example, a second platform 33 is slidably mounted on the right side of rods 26 and 28 by means of front and rear journal plates 35 and 37; centrally disposed between journal plates 35 and 37 and centrally located between rods 26 and 28 is a cam follower 39 perpendicularly extending from the undersurface of platform 33. A second clamping or gathering element 41 has a laminated construction with a central spacer 43 sandwiched between two sets of plates; the first set of plates includes an inner plate 45, an intermediate plate 47 and an outer plate 49, while the second set of plates similarly includes inner, intermediate and outer plates 51, 53 and 55, respectively. The two sets of plates and spacer 43 are fastened together as a unit by any suitable means, such as bolts and L-shaped brackets 57, to the top surface of platform 33 in edgewise relation thereto. Intermediate plates 47 and 53 each have a triangular end 59 (similar to the end 58 in FIG. 5), while inner plates 45 and 51 and the outer plates 49 and 55 extend beyond the triangular ends 59 and are provided with triangular notches 61; the ends 59 and notches 61 have identical apex angles that intersect each other adjacent their apexes in a transverse plane defined by a bisector of the apex angle.

As is illustrated in FIG. 5, the two gathering clamps 40 and 41 are oppositely slidable by cam means to be described hereinafter. The notches 60 and 61 move toward each other while gathering a pliable material therebetween. Such movement ceases when the notches 60 on the intermediate plates 46 and 52 engage the edges on the triangular ends 59 of the intermediate plates 47 and 53, and similarly when the notches 61 on the inner and outer plates 45, 51 and 49, 55, respectively, engage the edges on the triangular ends 58 of the inner and outer plates 44, 50 and 48, 54.

A plunger rod 63 having an actuating roller 65 on its free end slidably extends through the fixed spacer 43 for relative movement thereto. The plunger rod 63 is centrally disposed through the spacer 43 and as shown in FIG. 7, upper and lower contact rods 67 and 69 are slidably extending through the spacer 43. The contact rods 67 and 69 are current carrying conductors, the free ends of which have terminal lead wires for connection to contact wipers 71 and 73, respectively, fixedly mounted on an extension of the outer strip 49 (see FIG. 8). Coil springs 75 and 73 surround the outer ends of the contact rods 67 and 69, respectively, and are mounted in compression between the end face of spacer 43 and retainer nuts threaded onto the ends of the contact rods.

The inner end of the plunger rod 63 is fixed to a movable spacer block 79 which is slidably disposed between the two inner plates 45 and 51. The upper and lower contact rods 67 and 69 are likewise fixed to the spacer 79 for unitary movement therewith so that the plunger rod 63, the contact rods 67 and 69 and the spacer 79 move as a unit against the bias of the return springs 75 and 77 for a purpose to be described hereinafter. The inner ends of contact rods 67 and 69 have conductor brackets 81 and 83 protruding from the inner edge of the movable spacer 79; and electrically heated cutting wire 85 spans the conductor brackets and has its ends attached to tension springs 87 and 89, respectively secured to the upper and lower edges of the spacer 79.

Figure 10:
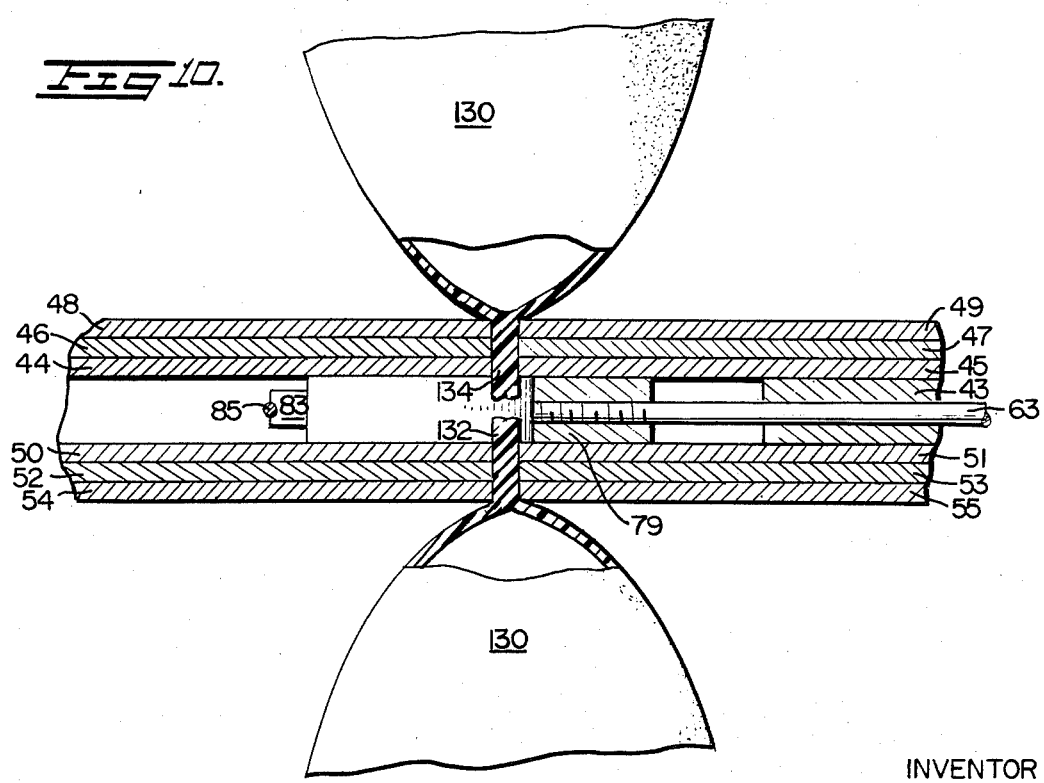
FIG. 10 is an enlarged partial cross section taken along a line looking in the direction of the arrows 10—10 of FIG. 9 but showing the final severing operation.

Movement of the spacer 79 is effected by the roller 65 engaging an increasingly sloped cam surface 91 located on the center leg of a contactor-cam unit 93 which is vertically secured to an end portion of the frame 10 by a pair of spaced mounting rods 95—95 (FIG. 2 and 10). As is shown in FIG. 3, the contactor cam unit has a generally mirrored E shape with a pair of contactor strips 97 and 99 fixed between the center leg defining the cam surface 91 and the respective end legs. The contactor strips 97 and 99 are electrically connected to a suitable power source (not shown).

The gathering clamps 40 and 41 are reciprocated relative to each other by means of their cam followers 38 and 39 following the contour of equally spaced cam tracks fixed to the frame 10. As is shown in FIG. 1, the two cam tracks have entrance sections 100 and 101 respectively receiving the left cam follower 38 and the right cam follower 39, converging sections 102 and 103, straight sections 104 and 105, diverging sections 106 and 107, and exit sections 108 and 109.

Centrally mounted on the top portion of the frame 10 is a feed and extruder unit including a die body 110 having a side conduit 112 opening into a cylindrical die annulus 114 (see FIG. 4). As viewed in FIG. 8, the annulus 114 communicates with an annular die ring 116 adjustably fixed to the die body 110 by any suitable means, such as cap screws (not shown). The inner surface of the die ring 116 is frusto-conical in shape to conform to a corresponding shape on the adjacent end of a cylindrical die core 118; the lower inner periphery of the die core 118 is engaged by an insulating spacer ring 120. The upper end of the die core 118 extends out of the die body 110 and is adjustably fixed thereto by a threaded nut 122 that permits adjustment of the die orifice. A locking collar 124 is fixed to upper edge of the die core and defines an upper support guide for a feed tube 126 while the insulating spacer ring 120 defines a lower support guide for the tube 126. A dead air space is thus formed between the tube 126 and the die core 118 to serve as a heat insulator. An auger 128 is operatively disposed in the tube 126 and in the present arrangement is adapted to the driven intermittently by any suitable drive motor (not shown).

The material to be packaged is centrally fed by the auger 128 into a foamed thermoplastic container being concentrically extruded as shown at 118. The container 130 is gathered by the clamps 40 and 41 in two areas defined by the mating first and second sets of plates; i.e., the second set of plates 50, 52 and 54 on clamp 40 mesh with the second set of plates 51, 53 and 55 on clamp 41 to gather and clamp the extruded plastic by means of the notches 60 and 61 into a lower sealed portion 132, and similarly, the first set of plates 44, 46 and 48 on clamp 40 mesh with the first set of plates 45, 47 and 49 on clamp 41 to gather and clamp the extruded plastic by means of the notches 60 and 61 into an upper sealed portion 134. As is apparent from FIGS. 1 and 10, the two sealed portions 132 and 134 are spaced from each other and are severed by the cutting wire 85 with the lower sealed portion 132 defining the closed top of a completed container 130 and the upper sealed portion 134 defining the closed bottom of the subsequently extruded container 130.

METHOD AND OPERATION

The steps of manufacture according to the present invention will be described in their proper order in the following description of a sequence of operation of the above apparatus. Any suitable foamable thermoplastic material may be utilized, e.g., one of those mentioned in U.S. Pat. No. 3,343,216, the disclosure of which is incorporated herein by reference.

Suitable foamable thermoplastic materials or compositions contain a normally non-explosive, synthetic organic, thermoplastic polymer or resin and a non-explosive concentration of a foaming or blowing agent. The thermoplastic polymers or resins which can be extruded according to the invention include cellulose ethers and esters, e.g., ethyl cellulose, cellulose acetate, cellulose acetate-butyrate, homopolymers and interpolymers of monomer compounds containing the

grouping, such as olefins, e.g., ethylene, propylene, isobutylene, butene-1, vinyl halides, e.g., vinyl chloride; vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above-mentioned vinylidene monomers with alpha, beta-unsaturated polycarboxylic acids and derivatives thereof, i.e., maleic anhydride, diethyl maleate, dibutyl fumarate, diallyl maleate, dipropyl maleate, etc. A preferred class of materials with which optimum results are obtained are rigid, relatively non-elastic, thermoplastic resins, such as homopolymers and interpolymers of vinyl chloride, e.g., polyvinyl chloride, vinyl chloride-vinyl acetate copolymer (87:13), vinyl chloride-acrylonitrile copolymer (80:20); homopolymers of vinylidene aromatic hydrocarbons and ring halogenerated derivatives thereof, e.g., styrene, o-chlorostyrene, p-methylstyrene, p-ethylstyrene, alpha-methylstyrene, vinyl naphthalene and interpolymers of such vinylidene monomers with each other and with other vinylidene monomers in which the interpolymer contains at least 70 percent of the vinylidene aromatic hydrocarbon compound, e.g., a copolymer of 70 percent styrene and 30 percent acrylonitrile. One of the preferred class of resins is thermoplastic styrene polymers containing at least 70 percent by weight of styrene in the structure.

Unless otherwise indicated, all parts and percentages are by weight.

When employing polystyrene there can be employed normal crystal grade polystyrene or high impact polystyrene or a mixture containing 5 to 95 percent normal crystal grade polystyrene and the balance high impact polystyrene. When employing a thermoplastic styrene polymer it normally contains greater than 50 percent by weight of styrene and preferably at least 70 percent by weight of styrene in its structure. High impact polystyrenes are frequently prepared by polymerizing monomeric styrene in the presence of 2½ to 10 percent by weight of a rubbery diene polymer or by polymerizing styrene in the presence of such amounts of a difunctional material. Examples of high impact styrene include a terpolymer of 5 percent acrylonitrile, 5 percent butadiene and 90 percent styrene; a copolymer of 5 percent butadiene and 95 percent styrene; the product made by polymerizing 95 percent of styrene in the presence of 5 percent of polybutadiene; a copolymer of 5 percent chlorosulfonated polyethylene and 95 percent styrene; a blend of 97.5 percent polystyrene and 2.5 percent polybutadiene; a blend of 95 percent polystyrene and 5 percent hydrogenated polybutadiene containing 35.4 percent residual unsaturation; polystyrene formed in the presence of 5 percent hydrogenated polybutadiene containing 4.5 percent of residual unsaturation, a blend of 95 percent polystyrene and 5 percent polyisoprene, and a copolymer of 99.5 percent styrene and 0.5 percent divinyl benzene.

Other suitable thermoplastic resins include polycarbonates, e.g. the polymer from bisphenol-A and diphenyl carbonate; polyoxymethylene (Delrin), oxymethylene-alkylene oxide copolymers, e.g. oxymethylene-alkylene oxide (95:5); polyurethanes, e.g. from toluene diisocyanate and polypropylene glycol molecular weight 2,025; Dacron (polyethylene terephthalate), nylon (e.g., polymeric hexamethylene adipamide). ABS terpolymers can be used, e.g., the terpolymer of 25 percent butadiene, 15 percent acrylonitrile and 60 percent styrene (a rigid ABS terpolymer), as well as other terpolymers containing 25 to 60 percent butadiene, 10 to 20 percent acrylonitrile and 20 to 60 percent styrene.

The invention is of particular value with foams from polyethylene (of high density, e.g., 0.960, medium density, e.g., 0.935 or low density, e.g., 0.914), polypropylene, copolymers of ethylene and propylene (e.g., 50–50 copolymer) and regular or high impact polystyrene. Copolymers of ethylene with butene-1 (e.g., 9:10) also can be employed.

To insure the formation of a uniform, foamed portion or core a nucleating agent should be used in forming the foamed container. When a nucleating agent is employed, it is used in an amount of from 0.02 to 10 percent of the total polystyrene by weight. Preferably, 0.4 to 2 percent of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least eight carbon atoms in the molecule, alkylphenolalkylene oxide adducts, e.g., Triton X–100

(t-octylphenol-ethylene oxide adduct having 10 ethylene oxide units in the molecule), sodium lauryl sulfate and sodium dodecylbenzene sulfonate. The wetting agent can be nonionic or anionic.

A foaming or blowing agent is incorporated into the thermoplastic polymer. Preferably the foaming agent is dispersed throughout the polymer, for example, in the manner taught by U.S. Pat. Nos. 2,941,964; 2,864,778; 3,026,273; 3,026,272; 3,026,274; and Canadian Pat. No. 682,464, the disclosures of all of which are incorporated herein by reference.

Thermoplastic polymers containing foaming agents are available commercially.

The foaming agent is normally liquid under the temperature and pressure existing in the extruder and is normally gaseous under ambient (atmospheric) pressure at the temperature of the composition immediately as it leaves the extruder. The foaming agent should be non-reactive with the polymer and, in the low concentrations used, should have not more than a slight solvent action on the polymer. Suitable foaming agents include aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30 percent of methylene chloride or other volatile lower halogenated hydrocarbon. Usually, the amount of foaming agent will be 0.1 to 15 percent by weight of the polymer, e.g., polystyrene to be expanded. The amount of foaming agent will depend upon the extent of foaming desired. In general, the greater the amount of foaming agent in the polymer mixture the more the expansion. It has been found that good expansion can be obtained using very small amounts of the foaming agent.

Another mode of incorporating the foaming agent into the polymer is by premixing the pelletized, solid, thermoplastic polymer, e.g., high impact styrene polymer, with a minor amount of an absorbent having absorbed thereon, the foaming agent which is non-reactive with and which has not more than a slight solvent action on the polymer. The foaming agent should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1 to 15 percent, preferably, 0.5 to 10 percent by weight of the polymer, although up to 25 or 30 percent of absorbent can be employed. The absorbent is an inert filler of large surface area but small particle size, e.g., 200 mesh or below.

The amount of foaming agent absorbed on the absorbent can vary from 5 to 150 percent or more based on the weight of the absorbent. The amount of foaming agent absorbed will depend upon the capacity of the absorbent for the particular foaming agent. Normally, the absorbent containing the foaming agent will appear to be a dry powder. The foaming agent employed should be one which is non-reactive with the particular polymer employed.

The technique and conditions for extruding the foamable thermoplastic composition to form a foamed tube are well known and are disclosed in, for example, U.S. Pat. No. 2,917,217; 3,290,198; 3,343,216 and 3,151,192 the disclosures of all of which are incorporated herein by reference. Any of the techniques and conditions disclosed in these patents can be used in the present invention except that cooling or chilling means other than ordinary atmospheric conditions are not applied to the tube as it issues from the extruder nor is the tube blown or expanded by air, other gaseous means or by a plug.

The foamable thermoplastic composition is fed to the hopper of an extruder and is passed through the extruder wherein it is heat-plasticized under pressure and is forced under pressure out of the annular die of the extruder in the form of a tube. Upon entering the atmosphere, the blowing agent flash evaporates to foam the walls of the tube and at the same time automatically cools the surfaces of the walls of the tube somewhat to impart some rigidity but not sufficiently to fully congeal the walls throughout. In this condition the surfaces of the tube wall are cooler than the inner portions and are relatively non-sticky. The tube walls are hot enough, however, to be formed, for example, by expansion with the filling substance, and set by subsequent cooling below the setting temperature of the thermoplastic composition.

Specific temperatures and pressures within the extruder depend primarily upon the specific thermoplastic polymer being extruded. Temperatures within the extruder, however, usually can range from about 200° F. to about 375° F., preferably from about 250° F. to about 325° F. and pressures within the extruder can range from about 100 psig to about 5,000 psig, preferably about 500 psig to about 2,500 psig, more preferably about 700 psig to about 1,500 psig. The conditions in the extruder are selected to heat-plasticize the foamable thermoplastic composition and cause it to flow through the orifice of the extrusion die. It is most beneficial to maintain sufficient pressure on the composition while it is in the extruder and die so that, at the temperatures existing therein, only a small amount, or none, of the foamable composition is allowed to foam prior to being extruded through the annular orifice.

When the tube issues from the die orifice, a portion of it is closed, e.g., through gathering and compressing by the clamps, as close as possible to the die orifice, for example, within 18 inches, preferably within 12 inches or less from the orifice. At the point of closing, the tube is still hot enough to be formed and sealed to itself under the pressure of the clamps without the application of external heat. Closing is performed on those portions of the tube which are still a state of plasticity to form fused hermetic seals at said closed ends. The closing step is carried out before the tube has cooled throughout to a temperature below its plasticity temperature, that is, the temperature at which the tube is capable of plastic flow under the pressure of the clamps (e.g., about 10 to 5,000 psi) to form a seal which can be set by cooling. The plasticity temperature is in and above the softening point range of the thermoplastic composition and usually is higher than the temperature at which the thermoplastic composition gels, congeals or sets. The plasticity temperature depends primarily upon the nature of the thermoplastic composition, As the thermoplastic composition issues from the die its internal (core) temperature is preferably below about 325° F., e.g., about 200° F to about 275° F. and the interior surface temperature is somewhat lower, perhaps about 1° to about 50° F. lower. At the point where portions of the tube are closed by the clamps, the internal temperature is still lower, perhaps another 1° to 50° F. lower than adjacent the die orifice, and the interior surface temperature is still somewhat lower, perhaps another 1° to 50° F. lower than adjacent the die orifice. The temperature of the interior surface which is contacted by the filling substance, therefore varies from the interior surface temperature of the tube as it issues from the die and the interior surface temperature of the tube at the point where it is gathered and compressed by the clamps.

The thickness of the tube walls as it issues from the die orifice is not narrowly critical. The walls of the tube as it issues, are in an expanding or foaming condition. The radial thickness of the orifice is not narrowly critical and can vary from about 0.005 or less to about 0.15 inch or more. After leaving the orifice, the tube walls foam or expand to a thickness of, for example, about 0.02 or less to about 0.75 inch or more. The thickness can be reduced by the draw down rate, i.e., the excess of the rate by which the clamps are pulling the tube over the rate at which the tube is being extruded and the expansion of the overall lateral dimensions of the tube by the filling substance. The thickness of the tube walls of the finished, sealed package can range from about 0.01 to about 0.75 inch or more.

The foamable thermoplastic material is continuously fed into the conduit 112 which represents a high pressure zone and is extruded from the annular die ring 116 to the atmosphere representing a low pressure zone. As is well known in the art, the foamable thermoplastic is in a heated condition permitting it to flow through the die body. While the die orifice may have any desired shape, it is illustrated as being circular in this instance. The chain drive 22–23 is also continuously operated but the auger 126 is intermittently operated to permit closure of the container 130 before filling with the substance to be packaged.

Figure 9:
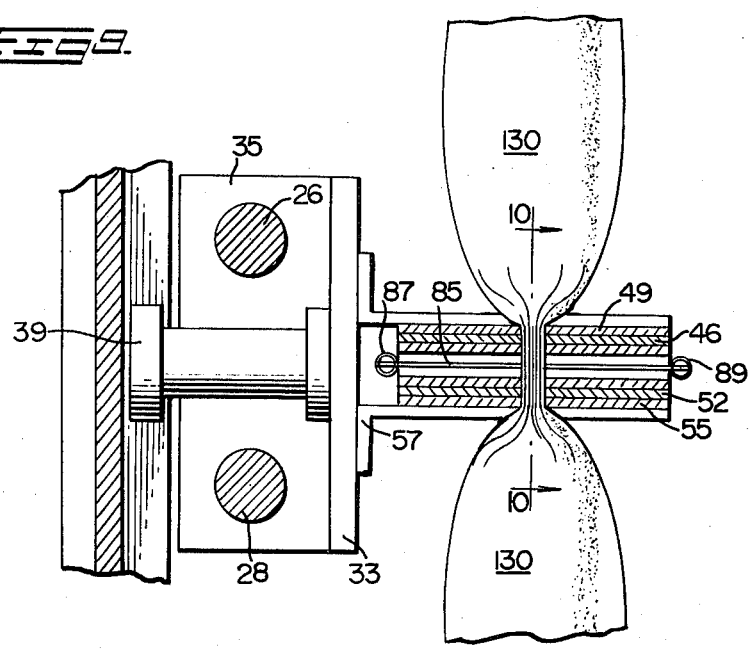
FIG. 9 is a partial cross section taken along line 9—9 of FIG. 8 and showing the initial sealing operation.

As is illustrated in FIGS. 1 and 2, the clamp carrier 24 traverses the support frame 10 with its cam followers 38 and 39 in the cam tracks. Entry of the cam followers 38 and 39 into the converging sections 102 and 103 causes inward movement of the clamps 40 and 41 toward each other; due to the mating notches 60 and 61, the extruded thermoplastic is being gathered therebetween. When the extruded thermoplastic leaves the die orifice, it is moved to a lower pressure and temperature causing it to be expanded into a foamed condition; at this time, the internal portions or core of the foamed thermoplastic is still in a state of plasticity due to the latent heat remaining in the foamed thermoplastic. The notches 60 and 61 progressively gather the foamed thermoplastic while it is still in its state of plasticity, into an ever decreasing cross section and compress the same with increasing pressure as the clamps 40 and 41 move closer together. When the cam followers 38 and 39 reach the straight sections 104 and 105, the foamed thermoplastic is compressed with such force as to fuse the same and define hermetic seals for the container; the fused seals are possible because the clamps are actuated while the internal portions or core of the foamed thermoplastic are still in a state of plasticity. Because of the first and second sets of plates on the clamps 40 and 41, the foamed thermoplastic is sealed at two areas 132 and 134 (FIGS. 9 and 10) spaced from each other by the dimension of the spacers 42 and 43.

The hermetic seal 134 represents the closed bottom of the container 130 which is now ready for the filling operation. By suitable control circuitry (not shown) the auger 128 is operated as the cam followers 38 and 39 leave the converging cam tracks 102 and 103. The container 130 is now being filled as the clamp carrier 24 moves downwardly along the cam sections 104 and 105. The filling material itself causes the inflation of the container 130 because of the plastic internal condition thereof as it is extruded from the die orifice. During this time, the clamps 40 and 41 remain engaged at the hermetic seals 132 and 134 whereby the container 130 is advanced during its continuous extrusion. A particular advantage of this arrangement is that there is no need for any supporting structure or mold for the container 130; the rate of movement of the clamp carrier 24 is one of the variables that determines the thickness of the wall of the container 130. The walls of the container can be made thinner by adjusting the rate of movement of the clamp carrier 24 to be faster than the rate of extrusion of the container 130.

During downward movement of the clamp carrier 24 as viewed in FIG. 1, the contact wipers 71 and 73 engage the contactor strips 97 and 99, respectively, to complete a circuit for the cutting wire 85. When the clamp carrier 24 approaches the lower end of the conductor in the cam unit, the roller 65 is in engagement with the increasing slope of the cam surface 91 which causes inward movement of the movable spacer 79 and the heated wire 85; as shown in FIG. 10, the heated wire 85 severs that portion of the clamped end between the hermetic seals 132 and 134. Just before the roller 65 leaves the cam surface 91, the next clamp carrier 24 has its cam followers 38 and 39 entering the converging sections 102 and 103 at which time the control circuitry deenergizes the auger 128 and the cycle is repeated. When the roller 65 leaves the cam surface 91 the movable spacer 79 and the attached heated wire 85 are retracted to their original position under the bias of the springs 75 and 77; the contact wipers 71 and 73 leave the contact strips 97 and 99 at this time causing deenergization of the heated wire 85.

It should be noted that the severance between the hermetic seals 132 and 134 does not release the lowermost container 130 at this time because the cam followers 38 and 39 are still in the straight sections 104 and 105 of the cam tracks. As the cam followers 38 and 39 move into the diverging sections 106 and 107, the clamps 40 and 41 are moved away from each other whereupon the lower container 130 is released to fall onto a suitable conveyor or a shipping carton. The cam followers 38 and 39 then proceed into the exit sections 108 and 109 so that the closed bottom 134 of the subsequently formed container 130 is also released but such container 130 is supported in suspension by the next clamp carrier 24 which has clamped and sealed the extrusion to form a closed top for the container.

The spacing between the clamp carriers 24 determine the size of the containers to be extruded. Thus, when the heated wire 85 is performing the cutting operation on the lowermost part of the container, the control circuitry has deenergized the auger 128 so as to stop the filling operation. However, the extrusion continues so that the next clamp carrier 24 has its cam followers entering the converging sections 102 and 103 to perform the clamping and sealing operation as described above.

Inasmuch as the container 130 is made of foamed thermoplastic, it has sufficient rigidity so as to be utilized for large industrial packaging application, e.g., a package containing fifty pounds of powder, soap, etc. In addition, the filled container 130 has sufficient resiliency to provide its own cushioning effect and thus eliminate the need for cellular type crating for shipping purposes.

EXAMPLE

Homopolymeric polystyrene pellets, containing 5 percent pentane, about 0.5 percent sodium bicarbonate, and about 0.5 percent citric acid (percentage based on the weight of polystyrene) was fed through a hopper to the feed end of an extruder. The extruder screw, 2 inches in diameter had a length to diameter ratio of 20/1 consisting of three constant pitch flight sections; namely, a feed section about one-half the length of the screw, a transition section about one-fourth the length of the screw, and a metering section about one-fourth the length of the screw. The extruder barrel was heated to approximately 250° F. at the feed section, 280° F. at the transition section, 280° F. at the metering section and 260° at the cross-head die. The exit orifice of the cross-head was one and three fourths inches in diameter with a circular opening of 0.020 inch thickness. The center of the cross-head mandrel had been bored out to a diameter of one and five eighths inches through which activated carbon powder would be metered as shown in FIG. 8. Upon emerging from the die the polystyrene foamed into a foamed unicellular seamless tube and was later expanded by the force of the carbon powder pressing against the interior walls of said tube as described below. A pair of jaws converged on the tube, progressively gathering the circular wall and compressing it to a cross section whose area was approximately three-sixteenths of an square inch. The temperature of the tube during sealing was about 240° F. Immediately after thus sealing said tube, the filler auger (128 FIG. 8) was rotated, rapidly feeding the carbon powder into the interior of the tube, expanding it to approximately 4 inches in diameter. The temperature of the inner surface of the tube contacted by the carbon ranged from about 160° F. to about 180°F. The wall thickness was approximately 0.090 inch after expansion and draw down. After a predetermined number of rotations (38 in this case) of the augur had been made, the rotation ceased, the augur having deposited the desired amount of powder into the package by virtue of its positive displacement design. The next set of jaws at that time sealed the package in the same manner as the prior set of jaws, thus completing the sealing of the package. The linear rate of speed of the jaws in the direction of extrusion was 25 feet per minute, sufficient to exceed the linear rate of flow of the plastic extrudate ( 20 feet per minute) as it exited from the die orifice, causing a desirable drawing down of the foamed plastic to control the wall thickness of the finished package. Cutting of the packages was accomplished by use of the hot wire (85 FIG. 8) in the seal area. The center to center distance of separation of the pairs of jaws was 12 inches, the production rate of the machine was 1,500 packages per hour, the weight of the package was 15 grams and the weight of the contents was 12 ounces.

Even though the foregoing description has mentioned comminuted materials as the substance to be packaged, it is to be understood that a fluid, such as a liquid detergent, may also be the packaged material. In such an instance, the feed means would be in the form of a check valve at the bottom of the tube 126 and an on-off valve at the top. Because of the fused seals 132 and 134 described above, the use of a liquid as the substance to be packaged becomes more acceptable than methods used heretofore. The fused seals 132 and 134 eliminate any possibility of wicking that is prevalent in the known prior art methods.

In accordance with the present invention, there is no need for a cooling agent or device and the substance being packaged is not exposed to the atmosphere or to any type of contamination. This feature permits the making of sterilized packages and an aseptic package is particularly advantageous to the drug industry for packaging drugs and to the dairy industry for packaging milk, cheese, etc.

Typical of comminuted materials that can be packaged according to the method of this invention are powdered, activated charcoal such as is used in the dry cleaning industry, powdered silica fillers used as reinforcing agents in the plastics industry, other powdered or granular materials, such as, powdered granulated dyestuffs, sodium bicarbonate, sodium chloride, calcium chloride, soap and detergent powers, powdered surfactants, powdered or granulated metals, such as, iron, nickel and tin powders, or granules, coffee granules, instant coffee powder or granules, and the like. Typical liquids that can be packaged according to this invention include liquid detergents, motor oil, water, milk, fruit and vegetable juices, soups, soft drink concentrates, liquid surfactants, liquid dyestuffs, and the like. The present invention can be used to package any liquid, powder or granulated substance which is inert to the thermoplastic polymer and is normally non-explosive under conditions existing within the tube of polymer as it leaves the extruder, and especially applies to those substances that are inert to the thermoplastic polymers and non-explosives at temperatures below about 400° F.

Inasmuch as the present invention is subject to many modifications, variations and changes in details, it is intended that all matter contained in the foregoing description or shown on the accompanying drawings, shall be interpreted as illustrative and not in a limiting sense.

What is claimed is:

1. In the method of making foamed thermoplastic polymer containers which comprises extruding from an extruder an extrudable, foamable composition comprising a normally non-explosive, synthetic organic thermoplastic resin made from a monomer selected from the class consisting of olefins, vinyl halides, vinylidene aromatic hydrocarbons and ring halogenated derivatives thereof, and a non-explosive concentration of a blowing agent, which is normally liquid under the pressure and temperature existing in the extruder, and is normally gaseous under atmospheric pressure at the temperature of the composition immediately as it leaves the extruder, to form a foamed tube, and closing portions of said tube to form the container, that improvement in making, filling and sealing said container to form sealed containers filled with a substance which is substantially inert to said polymer and normally non-explosive under conditions existing within said tube as it leaves the extruder, comprising the steps of,
   1. closing a portion of said tube by fusing its inner walls together before it cools throughout to a temperature below its plasticity temperature to form a bottom closed end,
   2. feeding said substance to be packaged into said foamed tube immediately upon formation of said bottom closed end to fill and expand said foamed tube before it cools throughout to a temperature below its setting temperature,
   3. closing a succeeding portion of said foamed tube by fusing its inner walls together before it cools throughout to a temperature below its plasticity temperature to form a top closed end.

2. The invention as recited in claim 1 wherein the substance to be packaged is a comminuted material.

3. The invention as recited in claim 1 wherein the substance to be packaged is a liquid material.

4. The invention as claimed in claim 1 wherein said thermoplastic resin is made from styrene.

5. The invention as recited in claim 4 wherein the bottom closed end and the top closed end are simultaneously formed from the continuously extruded thermoplastic with the bottom closed end being on the tube portion to be filled and the top closed end being on the tube portion that has been filled.

6. The invention as recited in claim 5 wherein the simultaneously formed closed ends are separated by an unsealed portion, and said unsealed portion is severed to permit removal of the resulting filled container.

7. The invention as recited in claim 4 wherein, during said feeding step, said tube is expanded to a predetermined diameter by forcing a selected volume of said substance into said tube.

8. The invention as recited in claim 7 wherein said tubing is supported solely at its closed one end during its expansion.

9. Invention as claimed in claim 4 wherein at least one of said closing steps is performed by gathering a portion of said tube and reducing the corss section of the gathered portion to fuse it and form a hermetic seal.

* * * * *